Patented Dec. 22, 1931

1,837,307

UNITED STATES PATENT OFFICE

EDWARD HYATT WIGHT AND BEVERLY OBER, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

PROCESS FOR MANUFACTURING ACID PHOSPHATE

No Drawing.   Application filed February 8, 1927. Serial No. 166,808.

This invention relates to a process for producing acid phosphate. In the processes now generally employed, it is the practice to mix the phosphatic rock and an acid and allow these ingredients to react in open containers. In these methods the rock and acid are agitated in some type of container for a short period of time, at the termination of which the resulting sludge is deposited in a den. The mass is allowed to remain here until, due to the reaction between the rock and acid, the mix takes on an initial firmness. It is then transferred to a storage chamber where the product is allowed to remain until it is cured and dried.

Such processes have been carried out generally in open containers. For this reason, among others, the initial concentrations of the reacting substances are not maintained and no control over these concentrations has been exercised. The extended treating and curing period has added greatly to the expense of production, as the output of a fertilizer unit has been limited by this very large time factor.

The primary object of our invention is to greatly decrease the time required for the manufacture of acid phosphate.

Another object of the invention is to accelerate the reactions occurring in the manufacture of this fertilizer.

A further object is to exercise effective control and adjustment of the physical and chemical conditions of the reacting substances.

A further object is to provide a single apparatus in which the separate steps of the process may be carried out.

We attain these and other equally important objects by treating insoluble phosphate rock and an acid in a container and by adjusting the physical and chemical conditions of the mix insure a rapid and complete reaction of the ingredients in a minimum of time.

As suggested hereinbefore, it has been the practice to mix phosphate rock and an acid and after this initial agitation to allow the mass to stand until reaction has run to completion. In these processes no attempt has been made to maintain high acid concentrations or to prevent the escape of any of the reacting components. The lowering of the acid concentrations, in the processes now employed, is aided by the evolution of gases which occur in the early states of the reaction. The evolved gases, such as carbon dioxide and hydrogen fluoride, weaken the concentration by carrying off portions of the acid in the form of sulphur trioxide.

The reaction between tri-calcium phosphate and sulphuric acid appears to proceed in two stages. In the first stage some free phosphoric acid is formed. This phosphoric acid then reacts with the unattacked tri-calcium phosphate and converts this to mono-calcium phosphate. The phosphoric acid is much less active than sulphuric acid and when it is exposed to air as in prior methods, it takes a considerable time to react completely. To this slow reaction, as well as to the weakened concentrations mentioned, is due in a large measure the necessity for an extended curing period.

We have found, as disclosed in our co-pending application Serial No. 112,678, filed May 29, 1926, that the time necessary for the manufacture of acid phosphate fertilizer may be greatly decreased and the improved product obtained by the treatment of the raw material in an autoclave. As there disclosed, the rock is admitted to a container and the air therein evacuated. By reason of this evacuation the subsequent reaction between the rock and acid was greatly accelerated because of the quick and complete penetration of the acid.

We have also found, as disclosed in our co-pending application Serial No. 117,170, filed June 19, 1926, that a very desirable product may be obtained by mixing acid and phosphate rock in a container which is adapted to prevent the escape of the reacting components, thereby insuring a complete and rapid utilization of the ingredients.

The success of these processes depends in a large measure on the proper adjustment of conditions within the container. Our present invention comprehends new methods of treatment of phosphate rock and acid by which the desired conditions of the reacting mass are obtained.

For carrying out our process, we provide a container which may be sealed so as to exclude air and in which a vacuum may be set up. The cover of this container may be provided with a suitable stirring mechanism which depends into the container and which, when operated, agitates the mass therein.

The container may be fixed or mounted for rotation. In the event that a non-rotatable container is used the body portion is provided with suitable pipes for the admission of acid or the components thereof. When a rotary autoclave or container is used, the inlet pipes may be detachably coupled to the body or may be nested within a hollow rotatable shaft on which the container is mounted. In each case the cover of the autoclave is provided with a release valve and a detachable connection to the vapor pump.

Within the container there is positioned a plurality of closed coils which may be mounted in any convenient position. As pointed out in connection with the acid inlet pipes, these coils may have a detachable inlet coupling or the inlet may be nested within the hollow shaft. As will appear more fully hereinafter, one of these is adapted to allow circulation of a heating medium therethrough and the other a cooling medium. In some cases it may be found desirable to omit the heating coil and supply the required heat from external sources, such as oil or gas burners positioned below the containers.

The coils, as has been explained, are adapted to permit the circulation of heating and cooling media. We prefer to use superheated steam and brine for the heating and cooling agents, respectively, although it is to be understood that these are mentioned only as examples, for any fluids which will serve to conduct heat to or from the container may be used.

In carrying out our process we admit phosphate rock, ground to a suitable degree of fineness, to the container. The vapor pump may then be connected to the container and set in operation to evacuate the air therefrom. A strong acid, such as sulphuric acid, may then be admitted. It will be appreciated that by reason of the vacuum within the container, the acid will enter with considerable velocity, the vacuum acting as a reverse pressure. This rapid injection of the acid will cause the agitation of the rock dust. By reason of the evacuation of the air, gases and occluded moisture, a quick and thorough penetration of the acid results. The agitation of the mass caused by the injection of the acid may be supplemented by operating the stirring mechanism or by rotating the autoclave.

We do not intend to be limited in our process to the use of an acid as such. We may inject into the container the components of the acid. Thus we may conduct the products of combustion of sulphur and nitre through the inlet pipes and admit these with the requisite quantity of water to the container. We also contemplate forming sulphur trioxide and admitting this with a determined quantity of water to the autoclave.

On the admission of the acid and agitation of the mix by operation of the mechanical stirrer or by rotation of the autoclave, the gaseous products of reaction are evolved. At the same time, as is well known, the temperature of the mass is raised. The amount of gas evolved will depend to a considerable extent upon the carbonate impurity of the rock which may vary through considerable ranges with the different types of raw material. If there is an excessive evolution of gas, some of this may be withdrawn by opening the relief valve at the top of the autoclave.

We have found in practice that the reactions occurring in the mix may be further accelerated by the addition of heat. As indicated hereinbefore, this may be done by applying heat to the bottom of the container by means of burners. Another method which we employ is to introduce superheated steam to the closed coil positioned within the container.

After the reactive substances have been mixed and heated, the mixture is allowed to remain for a time sufficient to insure complete reaction between the rock and acid. By the process thus far described the reactive substances are maintained at substantially their initial concentrations since material escape of the components is prevented. The reaction between the phosphoric acid and tricalcium phosphate is accelerated to a considerable degree by this means and by the maintenance of elevated temperatures. The provision of a thorough mixing minimizes the formation of nodules or dust and insures a complete conversion of the phosphate rock.

It is to be understood that our present process which comprehends the utilization of a cooling medium to accelerate the crystallization, to be more fully described hereinafter, is not restricted to the identical steps thus far described. We may mix the rock and acid without the preliminary air evacuation, as is more fully explained in our co-pending application Serial No. 117,170 referred to.

At this point the product is ready for crystallization. It is to be noted that as compared with prior processes in which the phosphate has been treated in large batches and the separate batches dumped one on the other, we have provided a process in which at the crystallization stage the mass has a very large surface area as compared with its volume. Inasmuch as the mass is maintained in the same container in which the ingredients were originally mixed, there is no disturbance of the porosity of the cake. Both of these conditions tend to facilitate crystallization.

To initiate the crystallization, the pressure in the container is released and at the same time, by operating the control valve in the cooling coil, brine is caused to flow therethrough. As will be understood, the quick release of pressure is accompanied by a rapid drop in temperature. In test runs we have found that when a generated pressure of ninety pounds is reduced to atmospheric pressure there was a simultaneous drop in temperature of approximately thirty degrees. This of itself is sufficient to start crystallization. The initiation of crystallization is further assured and the complete crystallization accelerated by further cooling by means of a brine or equivalent cooling medium.

After the mass has been subjected to the quick change in temperature occasioned by the drop in pressure and the abstraction of heat by the cooling means, it is allowed to remain under atmospheric pressure for a short time. At this stage the mass is partially crystallized but is not completely dry. The moisture content of the product must be reduced so that it may be in proper condition for grinding.

The final step of completing the crystallization and drying may be carried out in the same container. The cover is tightly clamped on the autoclave and the mass reheated either by the external burners or by causing a flow of super-heated steam through the heating coil. It will be perceived that this heat treatment will tend to cause vaporization of any moisture which may be occluded in the mass. After a short heat treatment the flow of steam is cut off or the burner flames are extinguished as the case may be. The vacuum pump is then connected to the container and the air partially evacuated. It will be appreciated that here, as in the case of the prior vacuum treatment, there is a second quick drop in temperature concomitant with the pressure reduction. We propose to increase this rapid temperature drop by providing a flow of brine through the cooling coil. This second vacuum set up within the autoclave serves to draw off the moisture. The quick drop in temperature, due in part to the pressure reduction and in part to the positive cooling by the brine, completes the crystallization of the product. After this treatment the mass is substantially dry and completely crystallized. It may then be removed from the autoclave and after grinding is ready for packing and shipment.

It is to be noted that the various steps in the process are effectually carried out in the one mechanical element. In addition we utilize our heating and cooling media at two different stages and are enabled thereby to greatly decrease the time required for the complete process without using additional structure. By this process therefore we have effected great economies in material and time, in addition to insuring a thoroughly satisfactory product.

While we have described the practical apparatus for carrying out our new method, it is to be understood that this is clearly for the purpose of exemplification, for since the essential features may be effected by other specific mechanical structures, we do not intend to be restricted to the device described nor do we intend that our process shall be limited short of its comprehensive scope as defined in the appended claims.

We claim:

1. The process for manufacturing acid phosphate comprising passing a mixture of ground phosphate rock and an acid into a container, heating the mix while preventing material escape of the components and subjecting the resulting product to the cooling action of a pressure drop and a cooling medium to accelerate crystallization of the mass.

2. A process for manufacturing acid phosphate comprising passing a mixture of ground phosphate rock and an acid into a container, heating the mix while preventing material escape of the components, and subjecting the resulting product to the cooling action of a cooling medium and setting up a vacuum in the container to accelerate crystallization of the mass.

3. The process for manufacturing acid phosphate comprising acidulating phosphate rock in a substantial deaerated container, heating the mass while preventing material escape of the components and subjecting the resulting product to concurrent internal and external cooling actions to accelerate crystallization of the mass.

4. The process of manufacturing acid phosphate comprising acidulating phosphate rock in a pressure tight container, maintaining the mix therein without material escape of the components and crystallizing the mass by subjecting it to concurrent internal and external cooling actions.

5. The process of manufacturing acid phosphate comprising acidulating phosphate rock in a container, maintaining the mix therein without material escape of the components and subsequently crystallizing the mass by subjecting it to concurrent cooling actions in separate stages.

6. The process for manufacturing acid phosphate comprising passing a mixture of ground phosphate rock and an acid into a container, heating the mix while preventing material escape of the components and subjecting the product to concurrent internal and external cooling actions in a plurality of stages to accelerate crystallization of the mass.

In testimony whereof we affix our signatures.

BEVERLY OBER.
EDWARD HYATT WIGHT.